Dec. 12, 1961 E. KETTEL ET AL 3,013,228
MECHANICAL FREQUENCY FILTER
Filed Jan. 7, 1958 4 Sheets-Sheet 1
FIG. 1
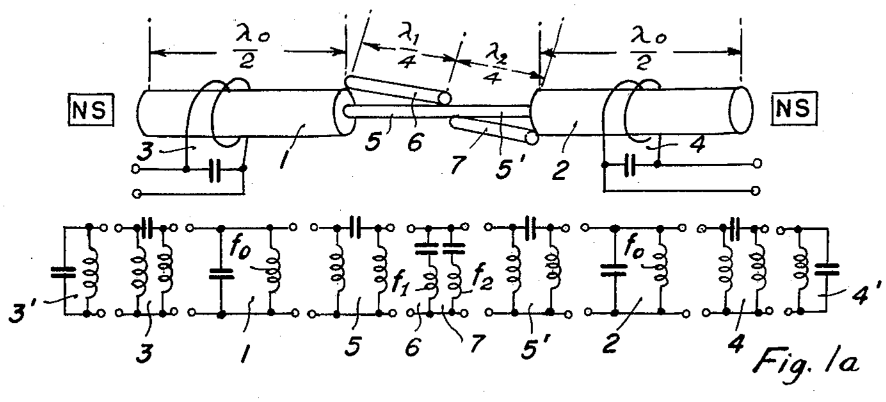
Fig. 1a
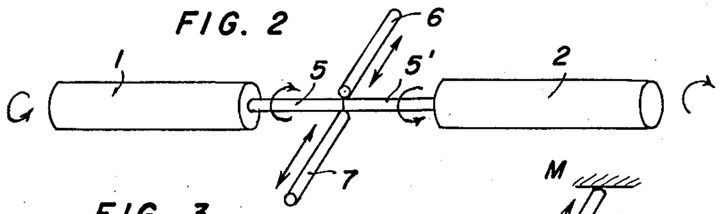
FIG. 2
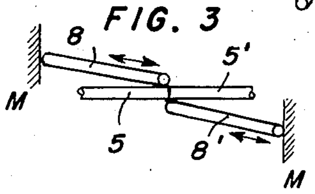
FIG. 3
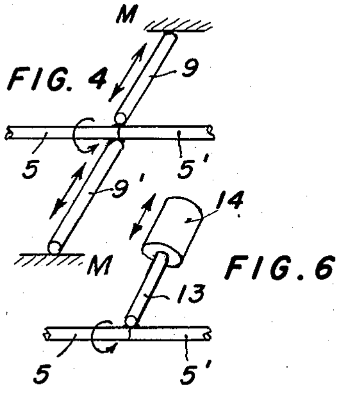
FIG. 4, FIG. 6
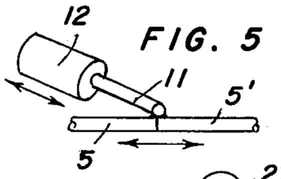
FIG. 5
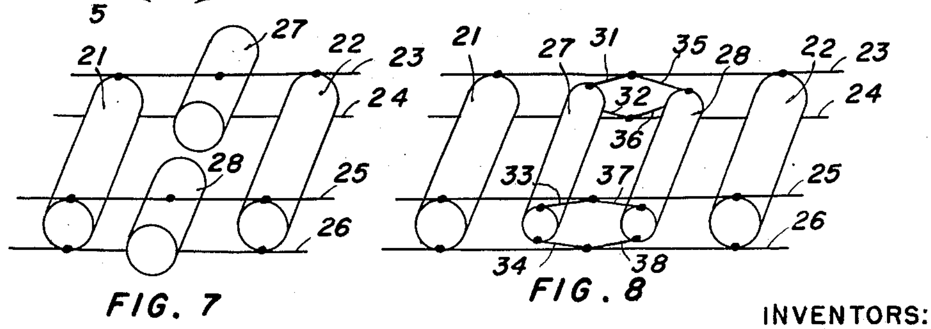
FIG. 7, FIG. 8
INVENTORS:
ERNST KETTEL,
MANFRED BÖRNER,
HORST OHNSORGE
BY [signature]
PATENT AGENT INVENTORS:
ERNST KETTEL,
MANFRED BÖRNER,
HORST OHNSORGE
BY Eric D. Frankel
PATENT AGENT

INVENTORS:
ERNST KETTEL,
MANFRED BÖRNER,
HORST OHNSORGE

BY [signature]

PATENT AGENT

INVENTORS:
ERNST KETTEL,
MANFRED BÖRNER,
HORST OHNSORGE
By Eric D. Frankel
PATENT AGENT 3,013,228
Patented Dec. 12, 1961

3,013,228
MECHANICAL FREQUENCY FILTER

Ernst Kettel, Manfred Börner, and Horst Ohnsorge, Ulm/Donau, Germany, assignors to Telefunken G.m.b.H., Berlin, Germany Filed Jan. 7, 1958, Ser. No. 707,581
Claims priority, application Germany Jan. 12, 1957
14 Claims. (Cl. 333—71)

Figure 9:
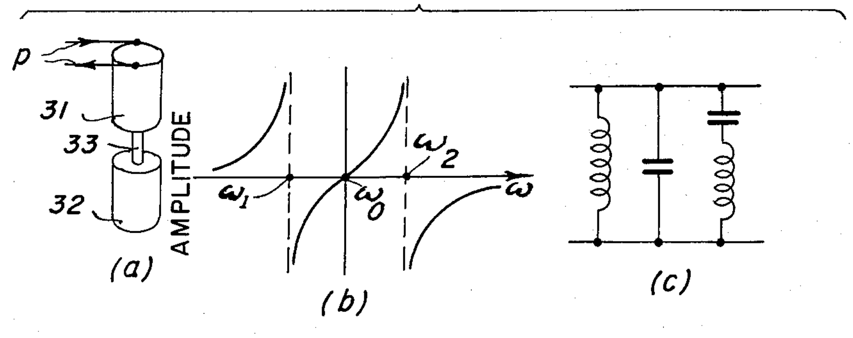

A number of proposals have been made in recent years about mechanical filters, more particularly of the coupling type, that is, wherein infinite attenuation is remote from the pass band (Proc. I.R.E. January 1957, pages 5–16). Said filters comprise mechanical resonant elements which may be regarded as $\lambda/2$ sections of acoustical lines and are coupled together by means of coupling members, the length of which is generally, though not necessarily, equal to $\lambda/4$ or an odd multiple thereof. When in the following there is reference to $\lambda/2$ or $\lambda/4$ line sections, $n\lambda/2$ or $n\lambda/4$ lengths (where $n$ is any integer or an odd integer respectively) will also be considered as within the meaning.

Filter elements in such arrangements can be excited by acoustic vibrations in various manners, in particular resonators can be caused to vibrate in the longitudinal mode or in the torsional mode. Usually coupling elements are caused to vibrate in the same mode of vibration as resonant elements. However it has already been proposed to interconnect resonators vibrating in the torsional mode by means of coupling wires vibrating in the longitudinal mode in order to produce a mechanical frequency filter. Heretofore filters of the above-mentioned type have not been provided with rejector resonators, as already known in purely electrical filters.

In such filters very steep characteristics are obtained only at the cost of a great number of vibrating circuits. These filters will be improved and their prices reduced only by providing them with rejector resonators adjacent the pass band, as already done for electrical filters.

The object of the invention is to fix the overall cross-section of an acoustic line arranged in a mechanical filter at a given point for a predetermined frequency $f$, so as to completely remove any further propagation of vibrations at said predetermined frequency, namely the rejection frequency $f$.

According to one embodiment of the invention the rejector resonators in a filter having acoustic vibrating members of relatively large cross-section are so anchored to the coupling elements either directly or via further coupling elements that at the pole frequency they at least approximately secure the overall cross-section of the respective coupling element unmovably at the anchorage point. According to another embodiment of the invention rejections are generated on mechanical filters by using mechanical branches having two or more tuned mechanical circuits, so that two rejection frequencies are produced by each branch, one being above and the other below the pass band of the filter characteristic.

In order that the present invention may be clearly understood and readily carried into effect, embodiments thereof will be described by way of example with reference to the accompanying drawings. FIG. 1 illustrates the invention as applied to a coupling filter comprising two resonators 1 and 2 which vibrate in the longitudinal mode and are tuned to the centre frequency $f_0$ of the pass band by giving them a corresponding length $\lambda_0/2$ for longitudinal vibrations at said frequency. Via the coils 3 and 4 signal frequencies are respectively applied to and taken from the resonators which comprise for example biased ferrite elements. Any other suitable electro-mechanical coupling at the input and output can obviously be used. Both resonators are interconnected by means of a coupling wire 5, 5′ in which signal frequencies propagate as longitudinal waves. Rejector resonators in the form of further wires 6, 7 are disposed approximately parallel to the wire 5 and have one end connected, e.g. welded, to the centre point thereof. Said further wires may have the lengths $\lambda_1/4$ and $\lambda_2/4$ for longitudinal waves, wherein $\lambda_1$ and $\lambda_2$ correspond to the rejection frequencies $f_1$ and $f_2$ which shall be attenuated by the rejection filter. In a band-pass filter the frequencies $f_1$ and $f_2$ will be chosen preferably at the edges of the pass band, preferably above and below respectively.

Fig. 1*a* represents an equivalent circuit diagram for the arrangement of FIG. 1. The corresponding elements in both drawings are denoted by the same reference numerals. The coils 3 and 4 are shown as four-terminal coupling networks between the electric circuits 3′ and 4′ at the ends of the assembly and the parallel tuned circuits representing the resonators 1 and 2. The portions 5 and 5′ of the coupling wire appear again as four-terminal coupling networks. The rejector elements 6 and 7 are shown as series resonant circuits shunt-connected to the filter, thus forming a short-circuit at their resonant frequencies. With the relationship $f_1>f_0>f_2$ as indicated above, one circuit represents a capacity in the pass band around $f_0$ and the other circuit represents an inductance, so that in the pass band their action corresponds to the parallel circuit coupled via the four-terminal coupling networks 5 or 5′.

FIG. 2 shows the application of the invention to a filter having a structure similar to the filter of FIG. 1 but wherein both resonators and coupling wires are caused to vibrate in the torsional mode. In this case the rejector resonators 6 and 7 are not welded substantially parallel to the coupling wire like in FIG. 1, but perpendicular thereto. While the coupling wire 5, 5′ is excited in the torsional mode, the rejector resonators 6 and 7 are caused to vibrate in the longitudinal mode and their lengths $\lambda_1/4$ and $\lambda_2/4$ must be dimensioned for such vibration modes correspondingly. The equivalent circuit diagram is identical to the one already illustrated in FIG. 1*a*.

In the aforedescribed forms the rejector elements comprise $\lambda/4$ resonators the free ends of which can vibrate freely. Such pole elements may be replaced by $\lambda/2$ rejector elements 8, 8′—9, 9′ the ends opposite to those connected to the coupling wire 5, 5′ are unmovably fixed within the desired frequency range by being anchored to a large mass M. This is shown in FIGS. 3 and 4; more particularly in FIG. 3 the coupling is to a wire 5, 5′ vibrating in the longitudinal mode and in FIG. 4, the coupling is to a wire vibrating in the torsional mode. The other elements of the filter itself are not represented in these drawings.

It is also possible to couple the rejector resonators to the coupling wires 5, 5′ through additional coupling wires. In such a case it is not necessary to give the resonator the same small diameter as the coupling wire 5, 5′ itself. FIG. 5 illustrates an embodiment for a filter having a coupling wire which vibrates in the longitudinal mode. The remaining filter elements are not represented. The rejector elements, one of which only is shown in the drawing, are here secured, preferably by welding, to the junction of parts 5, 5′ of the coupling wire; each rejector element comprises a coupling wire 11 and a resonator 12 attached to one end thereof. Preferably the resonator has a larger diameter than the coupling element 11 and comprises either a $\lambda/2$ resonator vibrating freely at the far end thereof or a $\lambda/4$ resonator as shown in FIG. 3 with the far end thereof anchored to a large mass M. As illustrated in FIG. 6 corresponding arrangements with coupling wires vibrating in the torsional mode can also be used; in this case the rejector element comprises a rejector resonator 14 vibrating in the longitudinal mode and a coupling wire 13 which extends at right angles with the coupling elements 5, 5'. Here again it is advantageous to couple a plurality of resonators tuned to different rejection frequencies to the same point.

FIGS. 7 and 8 show examples of application of the invention to mechanical filters wherein there are provided resonant sections vibrating in the torsional mode and acting as filter elements which are coupled to each other by means of one or more coupling lines vibrating in the longitudinal mode.

FIG. 7 is an example of direct coupling of such rejector elements to the coupling line. Rejector resonators and also resonant sections of the filter itself are caused to vibrate in the torsional mode. Resonators 27 and 28 are arranged between both resonant sections 21 and 22 coupled together by means of four wires 23, 24, 25, 26. These resonators are $\lambda/2$ long at the rejection frequency and are welded in a central plane to the coupling wires 23, 24 and 25, 26 respectively. When the resonators 27 and 28 are tuned to the same rejection frequency they may be united into a single continuous element.

FIG. 8 shows a further modification wherein the resonators 27 and 28 vibrating in the torsional mode are not directly coupled to the wires 23, 24, 25, 26 but via further coupling elements 31, 32, 33, 34 and 35, 36, 37, 38 respectively. Such an arrangement has the particular advantage of being very compact and readily accommodated in a small housing.

The invention has been disclosed so far with reference to embodiments wherein each rejector resonator produces only a single resonance. However there may be provided rejection elements having a plurality of resonant frequencies, as explained hereafter.

In FIG. 9 there is shown at (*a*) a rejection element which consists of two resonant sections 31, 32 coupled together by means of a $\lambda/4$ coupling element 33. When the vibrating circuits 31 and 32 coupled through 33 are caused to vibrate in the torsional mode in response to the forces P, as shown in the drawing, they exhibit the coupling frequencies $\omega_1$ and $\omega_2$ and their centre frequency lies at $\omega_0$, approximately as shown at (*b*) of FIG. 9. The input impedance of such a resonator unit exhibits a series-resonance at $\omega_0$ and parallel-resonances at $\omega_1$ and $\omega_2$. An equivalent circuit diagram is shown at (*c*) of FIG. 2.

Figure 10:
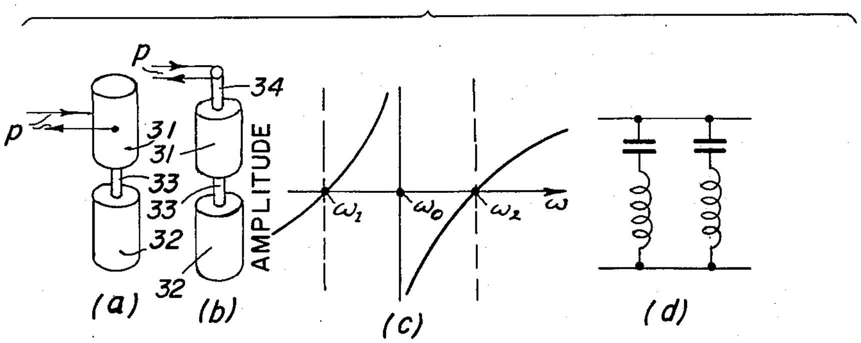

In FIG. 10 there is shown at (*a*) a modification of this two-circuit rejection element wherein the forces P are not applied to the end of the resonator 31 but at a distance $\lambda/4$ therefrom, thus for example, to the centre of the resonator formed as a $\lambda/2$ circuit. The same effect is obtained by arranging a $\lambda/4$ transformer member 34 at the end of the resonator 31, as shown at (*b*) of FIG. 10. As opposed to the case illustrated in FIG. 9 the arrangement of FIG. 10 performs an inversion of the apparent impedance, that is, parallel resonance now occurs at $\omega_0$ and series resonances at $\omega_1$ and $\omega_2$, as shown at (*c*) of FIG. 10. It will already be seen, more particularly from the equivalent circuit diagram (*d*) of FIG. 10, that there is thus provided a mechanical two-rejection device such as is known as a shunt element in purely electrical filters having rejections in the finite range.

Figure 11:
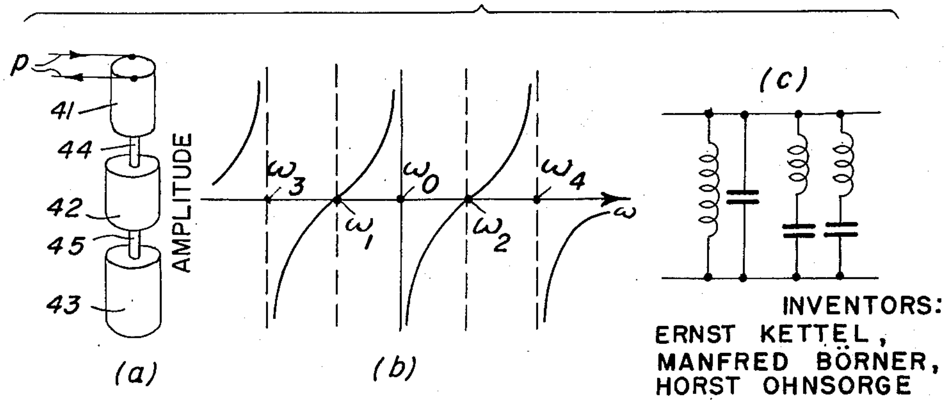

In FIG. 11 relationships for three vibrating circuits are illustrated. (*a*) represents a mechanical arrangement comprising the resonators 41, 42, 43 interconnected by the coupling elements 44, 45, wherein the forces P are applied to the end of the resonator 41. It is however not necessary that the forces should be applied to one of the outer resonators, they may also be applied to the centre resonator 42. The equivalent circuit diagram of this arrangement is shown at (*c*) in FIG. 11. It exhibits parallel resonance at three points, namely $\omega_0$, $\omega_3$, $\omega_4$ and series resonance at two points, namely $\omega_1$ and $\omega_2$, as shown at (*b*) in FIG. 11.

When such a filter element is used as a shunt in a filter and the pass band extends around the frequency $\omega_0$, poles will occur at $\omega_1$ and $\omega_2$, and two further poles will be set up beyond $\omega_3$ and $\omega_4$. It will now become apparent that this construction can be further extended if desired by using as rejection shunts every arrangement comprising an odd number of circuits where the forces are applied to the end of the resonators and every arrangement comprising an even number of circuits where the forces are applied to the centre of a resonator or to the end of an additional transformer line. In order to design a filter, values for the inductances and capacities of the equivalent circuit can be derived from the requirements of the attenuation characteristics. Mechanically this leads to requirements on the diameters of the various resonators and associated coupling elements, so that sizes of the resonant elemens used in such a pole element are by no means identical but can be widely different. The various resonant elements connected as four-terminal networks may be tuned to the centre frequency of the filter, but this is no absolute requirement.

Figure 12:
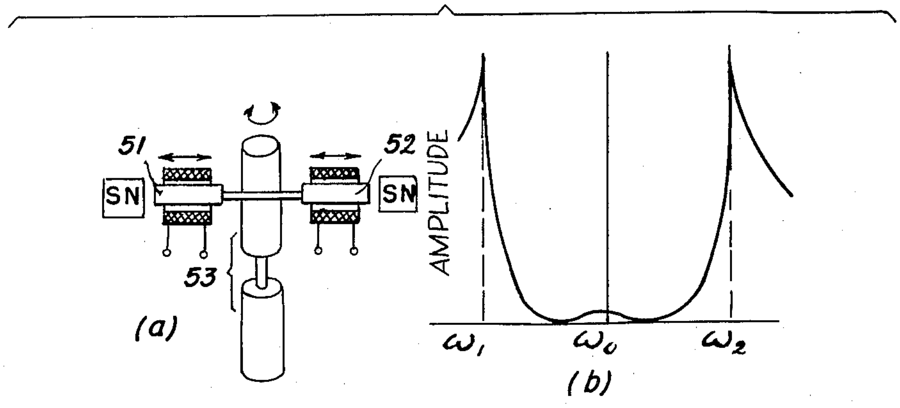

The following examples will now show how such multi-member rejection elements can be applied to mechanical filters. FIG. 12, at (*a*) represents a simple filter comprising an input and an output circuit 51 and 52 respectively both vibrating in the longitudinal mode and a rejection element 53 corresponding to FIG. 10 which is caused to vibrate in the torsional mode. The circuits 51 and 52 may be made of magnetostrictive material and thus at the same time convert electrical energy into mechanical energy and vice versa. FIG. 12, at (*b*) shows the attenuation characteristic curve of such a filter having rejections at the coupling frequencies $\omega_1$ and $\omega_2$ of the rejection element 53. The width of the band-pass characteristic results from the ratio between the apparent impedances of the resonant circuits and the coupling elements and it is calculated exactly in the same way as for electrical filters.

Figure 13:
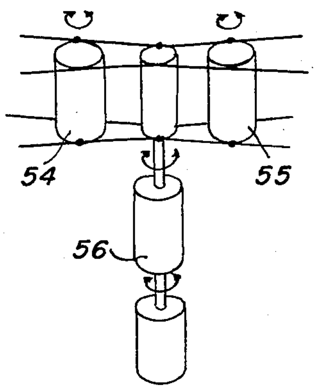

FIG. 13 shows the invention as applied to filters with resonant elements caused to vibrate in the torsional mode and coupled together by means of coupling elements, in particular coupling wires, vibrating in the longitudinal mode. A rejection element 56 similar to that of FIG. 11, at (*a*) is connected between the resonant elements 54 and 55.

Figure 14:
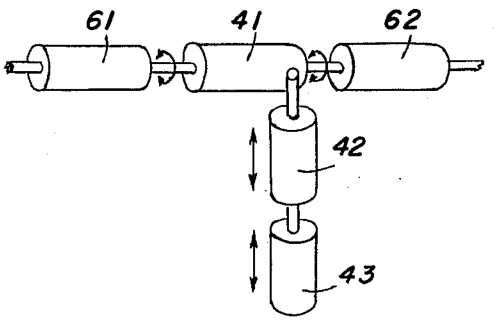

FIG. 14 shows a further form of embodiment of the invention. A rejection member according to FIG. 11, at (*a*) but caused to vibrate partly in the torsional, partly in the longitudinal mode is inserted in a conventional filter comprising elements 61 and 62 vibrating in the torsional mode. More specifically the portion 41 of said rejection member is caused to vibrate in the torsional mode like the filter elements 61 and 62, whereas the portions 42 and 43 are caused to vibrate in the longitudinal mode.

Figure 15:
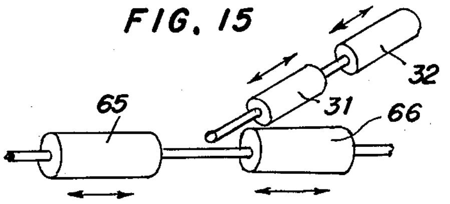

FIG. 15 represents part of a filter vibrating in the longitudinal mode and comprising the resonant elements 65, 66; between said elements there is coupled a rejection member comprising the elements 31 and 32, which is similar to that of FIG. 10, at (*b*) with the exception that it is caused to vibrate in the longitudinal mode.

Figure 16:
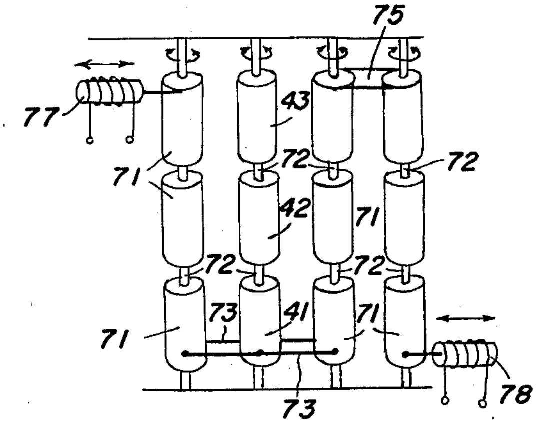

FIG. 16 shows a further and particularly space-saving form of embodiment of a filter having one rejection element according to FIG. 11, at (*a*). The filter is composed of resonant element 71 vibrating in the torsional mode and coupled alternately via the coupling elements 72 vibrating in the torsional mode and the coupling elements 73 vibrating in the longitudinal mode. The rejection element comprises the resonators 41, 42, 43 which are shaped and arranged exactly like the combination of three resonant elements 71 and two coupling elements 72; however said rejection element is mounted as a two-rejection device in the filter circuit and thereby creates rejections on both sides of the pass band characteristic curve, according to the invention. The filter is excited in known manner through a magnetostrictive transducer 77 and the output terminals are also connected to a magnetostrictive transducer 78. Such a filter is characterized by a particularly simple construction embodying only elements of equal length. Common holding devices can thus be used for clamping the whole unit.

In the foregoing there have been described several forms of filters having rejection elements formed as mechanical shunt members made of two coupled resonators, the input impedance of which exhibits a parallel resonance both above and below the pass band and a series resonance within the pass band.

In accordance with another aspect of the invention two such shunt members each comprising two resonators are arranged symmetrically on each side of the resonator inserted in the four terminal-filter circuit. This results in a particularly suitable arrangement of the elements in the filter unit, especially in view of preventing possible occurrence of secondary waves. Furthermore said symmetrically arranged resonators and, if desired, their coupling elements can also be used to clamp the filter on a supporting case or the like. Since the rejection elements are disposed on the sides of the filter they are particularly suitable for holding the filter in any desirable position.

Figure 17:
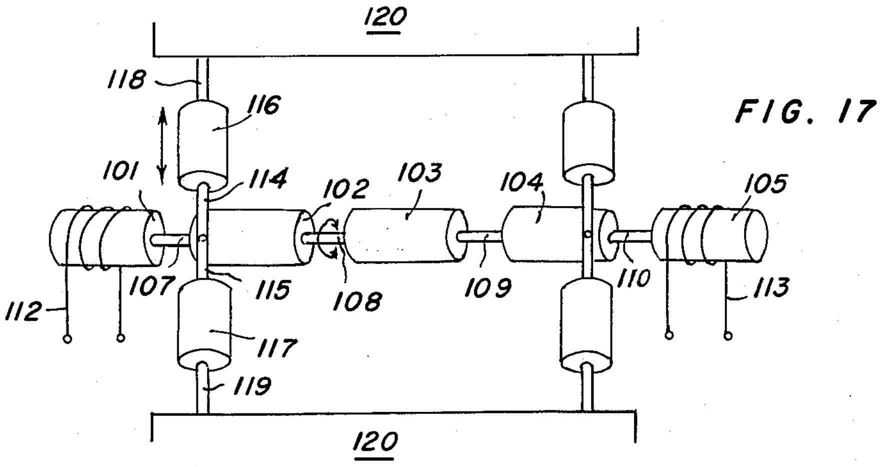

FIG. 17 shows a mechanical frequency filter having resonant elements 101, 102, 103, 104 and 105 caused to vibrate in the torsional mode and coupled to each other by means of the coupling elements 107, 108, 109 and 110. The latter consist of cylinders of smaller diameter co-axial to the resonant elements. The whole unit comprising resonant and coupling elements can thus be turned out of a single piece of material. The two outer resonant elements 101 and 105 are formed in known manner as magnetostrictive transducers and for this purpose are provided with input and output coils 112 and 113, respectively. Two resonators 116, 117 are coupled to the resonator 102 on each side thereof respectively via the coupling elements 114, 115 in such a way that they are caused to vibrate in the longitudinal mode in response to the vibrations of the filter element 102; said resonators are tuned to frequencies for example slightly above and slightly below the pass band of the filter characteristic in order to provide rejection. At the same time said resonators are used for holding the filter unit by clamping their ends remote from the filter to a support 120 via coupling elements 118 and 119 respectively. The support only represented schematically on FIG. 17 must have such a large mass that it will not become self-vibrating in response to the vibrations of the filter.

Like the resonator 102 the resonator 104 is also provided in the same manner with rejector resonators which are caused to vibrate in the longitudinal mode, so that it is possible to suspend the filter at four points on the support 120. In this type of filters comprising a plurality of members further intermediate resonant elements can be coupled to rejector resonators, thereby providing at the same time for further suspension of the filter on the support. Instead of the $\lambda/4$ long neck-type coupling elements preferably used and illustrated on the drawing well-known slug-type elements consisting of alternate thin and thick $\lambda/4$ long sections may also be employed.

Figure 18:
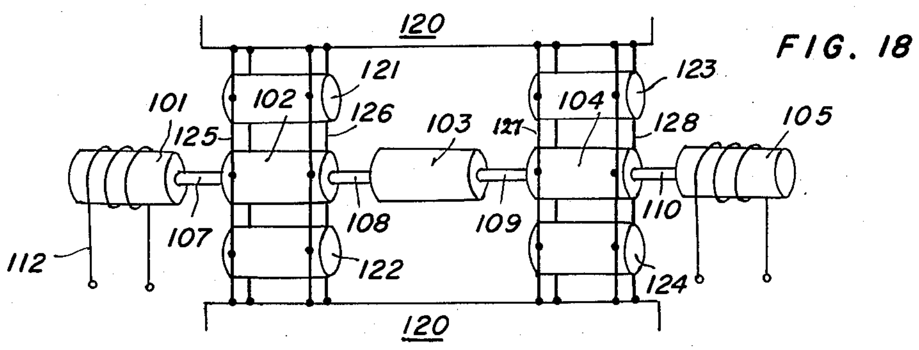

FIG. 18 illustrates a mechanical filter the resonant and coupling elements of which are shaped and arranged in a similar manner as in FIG. 17. Corresponding parts are therefore denoted by the same reference numerals as in FIG. 17. However, in order to provide rejection there are provided in this case four resonators 121, 122, 123, 124 which are caused to vibrate in the torsional mode and are arranged parallel to the axis of the filter unit and coupled to the resonant elements 102 and 104 via coupling wires 125, 126 and 127, 128 respectively. The latter extend beyond the resonators and have their ends connected to the support 120. This connection is achieved by welding like the connection of the coupling wires to the resonators.

Figure 19:
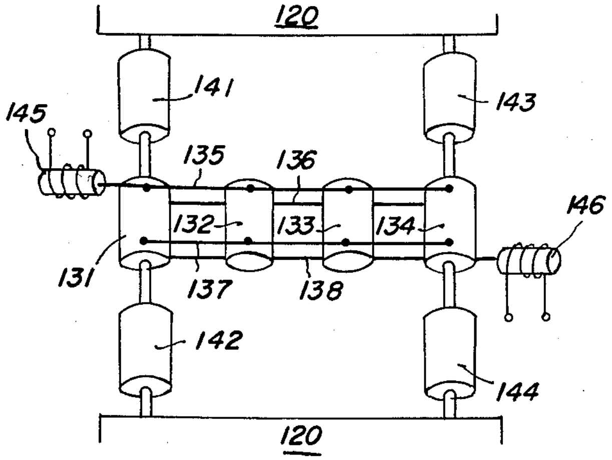

FIG. 19 shows another modification of the invention wherein four resonators 131, 132, 133, 134 are caused to vibrate in the torsional mode and are coupled to each other by four coupling wires 135, 136, 137, 138. The rejections according to the invention are set up by means of resonators 141, 142, 143, 144 which are connected in known manner to the resonators 131 and 134 on each side thereof respectively via torsional operating coupling members. The filter unit is excited by a transducer 145 vibrating in the longitudinal mode and the output vibration is derived from a similar transducer 146.

In mechanical filters according to the invention coupling conductors between the resonators of the filter unit and between said resonators and the resonators creating the poles are preferably about $\lambda/4$ long, since the ratios are then particularly apparent by calculation and the mean frequency of the pass band of a four-terminal filter corresponds to the resonant frequency $f_0$ of the individual resonators. However the invention is not limited to such dimensioning and other lengths of coupling conductors may also be used whereby a predetermined shift of the centre frequency of the pass band and/or of the fundamental frequency of the rejection elements is achieved.

We claim:

1. A mechanical filter comprising a plurality of resonator elements tuned to oscillate at a common resonant frequency and coupled by coupling elements to form a chain having a band pass characteristic about said resonant frequency, and at least one rejector resonator tuned to oscillate at a rejection frequency just outside said pass band, the cross section of said coupling elements transversely of said chain being small as compared with the cross section of said resonator elements, and each rejector resonator being coupled to one of said coupling elements at a point between two of said resonator elements so that at said rejection frequency said point becomes substantially immovable over the entire cross section of said coupling element.

2. A mechanical filter unit comprising a filter according to claim 1 wherein said resonator elements are cylindrical resonators vibrating in the torsional mode and arranged in a common axis, and wherein said rejector resonators are secured to a coupling element, vibrate in the longitudinal mode, and form a shunt member, the vibration direction of said rejector resonators being perpendicular to the axis of the filter unit.

3. A mechanical filter according to claim 1 wherein the rejector resonators are anchored on a supporting case to hold the filter unit.

4. A filter according to claim 1, wherein each of the rejector resonators in length is a whole number of half-wave lengths of said rejection frequency and secured at one end to a coupling element and rigidly anchored at the other end.

5. A filter according to claim 1, wherein each of the rejector resonators in length is an odd number of quarter-wave lengths of said rejection frequency and secured at one end to a coupling element by means of a connecting wire and rigidly anchored at the other end.

6. A filter according to claim 1, wherein each of the rejector resonators in length is an odd number of quarter-wave lengths of said rejection frequency and secured at one end to a coupling element and vibrating freely at the other end.

7. A filter according to claim 1, wherein each of the rejector resonators in length is a whole number of half-wave lengths of said rejection frequency and secured at one end to a coupling element by means of a connecting wire and vibrating freely at the other end.

8. A filter according to claim 1, wherein the rejector resonators comprise half-wave resonators tuned to said rejection frequency and vibrating freely at both ends, and said half-wave resonators being directly secured to the coupling elements.

9. A mechanical filter according to claim 1, comprising at least one pair of rejector resonators the input impedance of which exhibits at least two series resonant points respectively above and below the pass band and one parallel resonant point within the pass band of the filter characteristic.

10. A mechanical filter according to claim 9, wherein two rejector resonators are coupled symmetrically on each side of a resonator element of the filter unit.

11. A mechanical filter according to claim 1, wherein resonator elements and rejector resonators in the form of cylinders vibrating in a torsional mode are arranged with their axes parallel to each other and are coupled by wire-type coupling elements extending transversely to the axes and secured to points of the circumferences of said cylinders.

12. A mechanical filter according to claim 1, wherein said resonator elements are mechanically coupled to each other to form a four-terminal network, and said rejector resonators have two resonant frequencies, said rejector resonators comprising shunt members arranged symmetrically on each side of a resonator element in said network.

13. A mechanical filter unit according to claim 12 wherein said resonator elements vibrate in the torsional mode and are arranged along a common axis, wherein said rejector resonators vibrate in the torsional mode and form a shunt member, and wherein said rejector resonators are connected to the respective resonator of said filter unit via coupling elements which are in the form of wires extending transversely to the axis of said filter unit.

14. A mechanical filter comprising at least two resonator elements tuned to oscillate at a common resonant frequency and coupled by a coupling element to form a chain having a band pass characteristic about said resonant frequency, and at least one rejector resonator tuned to oscillate at a rejection frequency just outside said pass band, the cross section of said coupling element transversely of said chain being small as compared with the cross section of said resonator elements, and said rejector resonator being coupled to said coupling element at a point between said resonator elements so that at said rejection frequency said point becomes substantially immovable over the entire cross section of said coupling element.

References Cited in the file of this patent

UNITED STATES PATENTS

| | | |
|---|---|---|
| 1,933,306 | Berry et al. | Oct. 31, 1933 |
| 2,647,948 | Roberts et al. | Aug. 4, 1953 |
| 2,810,888 | George et al. | Oct. 22, 1957 |
| 2,821,686 | Burns | Jan. 28, 1958 |